United States Patent
Bian

(10) Patent No.: US 12,276,835 B2
(45) Date of Patent: Apr. 15, 2025

(54) OPTICAL COMPONENTS WITH ONE OR MORE EMBEDDED BRAGG REFLECTORS AND TAPERED WAVEGUIDE CORES

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 236 days.

(21) Appl. No.: 18/073,144

(22) Filed: Dec. 1, 2022

(65) Prior Publication Data
US 2024/0184042 A1    Jun. 6, 2024

(51) Int. Cl.
G02B 6/122    (2006.01)
G02B 6/124    (2006.01)
G02B 6/13     (2006.01)
G02B 6/12     (2006.01)

(52) U.S. Cl.
CPC ........... *G02B 6/1228* (2013.01); *G02B 6/124* (2013.01); *G02B 6/13* (2013.01); *G02B 2006/12061* (2013.01); *G02B 2006/12104* (2013.01); *G02B 2006/12107* (2013.01)

(58) Field of Classification Search
CPC ........ G02B 6/1228; G02B 6/124; G02B 6/13; G02B 6/12002; G02B 6/12007; G02B 6/12016; G02B 6/12009; G02B 2006/12061; G02B 2006/12104; G02B 2006/12107; G02B 2006/12038
See application file for complete search history.

(56) References Cited

U.S. PATENT DOCUMENTS

| | | | |
|---|---|---|---|
| 6,868,210 B2 * | 3/2005 | Takahashi | G02B 6/4246 359/333 |
| 6,892,004 B1 | 5/2005 | Yu | |
| 7,151,635 B2 | 12/2006 | Bidnyk et al. | |
| 7,680,371 B2 * | 3/2010 | Cheben | G02B 6/14 385/124 |
| 8,126,300 B2 | 2/2012 | Bidnyk et al. | |
| 10,197,731 B2 | 2/2019 | Teng et al. | |
| 10,429,582 B1 | 10/2019 | Bian et al. | |
| 10,444,434 B2 | 10/2019 | Qi et al. | |
| 10,746,925 B2 | 8/2020 | Jacob et al. | |

(Continued)

OTHER PUBLICATIONS

Klenk, R.H., Schweikert, C., Hoppe, N. et al. "Integrated dispersive structures for bandwidth-enhancement of silicon grating couplers." Optical and Quantum Electronics 52, 119 (2020). https://doi.org/10.1007/s11082-020-2194-0.

(Continued)

*Primary Examiner* — Andrew Jordan
(74) *Attorney, Agent, or Firm* — Thompson Hine LLP; Anthony Canale

(57) ABSTRACT

Structures for an optical component, such as an optical reflector or an Echelle grating, and methods of forming such structures. The structure comprises a first waveguide core positioned in a vertical direction over a semiconductor substrate. The first waveguide core includes a tapered section and a plurality of segments separated by a plurality of gaps. A second waveguide core, which is positioned in the vertical direction relative to the first waveguide core, includes a portion positioned adjacent to the first waveguide core.

14 Claims, 7 Drawing Sheets

(56) References Cited

U.S. PATENT DOCUMENTS

| | | | |
|---|---|---|---|
| 10,795,082 B1 | 10/2020 | Jacob et al. | |
| RE48,379 E * | 1/2021 | Ho | G02B 6/43 |
| 10,969,544 B1 * | 4/2021 | Hu | G02B 6/02085 |
| 11,029,465 B1 | 6/2021 | Rakowski et al. | |
| 11,125,944 B2 | 9/2021 | Bian et al. | |
| 11,187,852 B1 | 11/2021 | Bian et al. | |
| 11,243,350 B2 | 2/2022 | Bian et al. | |
| 11,264,424 B2 * | 3/2022 | Yokogawa | H01L 27/14623 |
| 11,340,403 B2 | 5/2022 | Bian et al. | |
| 11,378,743 B1 * | 7/2022 | Bian | G02B 6/305 |
| 11,467,341 B2 * | 10/2022 | Bian | G02B 6/2813 |
| 11,467,343 B2 | 10/2022 | Peng et al. | |
| 11,705,473 B2 * | 7/2023 | Yokogawa | H01L 27/14629 257/431 |
| 11,782,208 B1 * | 10/2023 | Bian | G02B 6/12007 385/131 |
| 11,803,010 B2 * | 10/2023 | Bian | G02B 6/1228 |
| 2008/0193079 A1 * | 8/2008 | Cheben | G02B 6/14 385/28 |
| 2008/0193080 A1 * | 8/2008 | Cheben | G02B 6/14 385/124 |
| 2014/0233881 A1 | 8/2014 | Hatori et al. | |
| 2021/0018690 A1 | 1/2021 | Bian et al. | |
| 2021/0091135 A1 * | 3/2021 | Yokogawa | H01L 27/14612 |
| 2022/0057576 A1 | 2/2022 | Bian et al. | |
| 2022/0146748 A1 | 5/2022 | Bian | |
| 2022/0208826 A1 * | 6/2022 | Yokogawa | H01L 27/14645 |
| 2022/0221650 A1 * | 7/2022 | Bian | G02B 6/34 |
| 2022/0252790 A1 | 8/2022 | Dezfulian et al. | |
| 2023/0128725 A1 * | 4/2023 | Bian | G02B 6/1228 385/14 |
| 2023/0143832 A1 * | 5/2023 | Bian | G02B 6/1228 385/43 |
| 2023/0367067 A1 * | 11/2023 | Bian | G02B 6/305 |
| 2024/0096917 A1 * | 3/2024 | Chang | H01L 27/14627 |
| 2024/0103221 A1 * | 3/2024 | Bian | G02B 6/1228 |
| 2024/0168199 A1 * | 5/2024 | Bian | G02B 6/136 |
| 2024/0184042 A1 * | 6/2024 | Bian | G02B 6/13 |

OTHER PUBLICATIONS

Cheng, L.; Mao, S.; Li, Z.; Han, Y.; Fu, H.Y. "Grating Couplers on Silicon Photonics: Design Principles, Emerging Trends and Practical Issues." Micromachines 2020, 11, 666. https://doi.org/10.3390/mi11070666.

Daniele Melati, Dan-Xia Xu, Ross Cheriton, Shurui Wang, Martin Vachon, Jens H. Schmid, Pavel Cheben, and Siegfried Janz, "Athermal echelle grating and tunable echelle grating demultiplexers using a Mach-Zehnder interferometer launch structure," Optics Express 30, 14202-14217 (2022).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," 2021 Optical Fiber Communications Conference and Exhibition (OFC), 2021, pp. 1-3.

A. Aboketaf et al., "Towards fully automated testing and characterization for photonic compact modeling on 300-mm wafer platform," 2021 Optical Fiber Communications Conference and Exhibition (OFC), 2021, pp. 1-3.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

European Patent Office, Partial European Search Report and Opinion issued in European Patent Application No. 23204229.1 on May 29, 2024; 13 pages.

European Patent Office, Extended European Search Report and Opinion issued in European Patent Application No. 23204229.1 on Jun. 18, 2024; 12 pages.

* cited by examiner

US 12,276,835 B2

OPTICAL COMPONENTS WITH ONE OR MORE EMBEDDED BRAGG REFLECTORS AND TAPERED WAVEGUIDE CORES

BACKGROUND

The disclosure relates to photonics chips and, more specifically, to structures for an optical component, such as an optical reflector or an Echelle grating, and methods of forming such structures.

Photonics chips are used in many applications and systems including, but not limited to, data communication systems and data computation systems. A photonics chip may integrate optical components and electronic components into a unified platform. Among other factors, layout area, cost, and operational overhead may be reduced by the integration of both types of components on the same chip.

Bragg gratings and Bragg reflectors are basic building-block elements included in many optical components, such as Echelle gratings and Bragg filters deployed in wavelength division multiplexing applications and grating couplers. Bragg gratings and Bragg reflectors include segmented waveguide cores and dielectric material filling the gaps or slots between segments. However, the inability to reliably fabricate small gaps and slots that can be filled by void-free dielectric material has hindered the ability to realize high-performance optical components and has also resulted in significant variabilities in the performance that is realized.

Improved structures for an optical component, such as an optical reflector or an Echelle grating, and methods of forming such structures are needed.

SUMMARY

In an embodiment of the invention, a structure for an optical reflector is provided. The structure comprises a first waveguide core positioned in a vertical direction over a semiconductor substrate. The first waveguide core includes a tapered section and a plurality of segments separated by a plurality of gaps. A second waveguide core, which is positioned in the vertical direction relative to the first waveguide core, includes a portion positioned adjacent to the first waveguide core.

In an embodiment of the invention, a structure for an Echelle grating is provided. The structure comprises a slab region positioned in a vertical direction over a semiconductor substrate, a first waveguide core connected to the slab region, and a plurality of second waveguide cores connected to the slab region. The slab region includes a side edge that is curved. The structure further comprise a plurality of Bragg reflectors positioned in the vertical direction between the slab region and the semiconductor substrate. Each Bragg reflector has an overlapping relationship with the side edge of the slab region, and each Bragg reflector includes a plurality of segments separated by a plurality of gaps.

In an embodiment of the invention, a method of forming a structure for an optical reflector is provided. The method comprises forming a first waveguide core positioned in a vertical direction over a semiconductor substrate, and forming a second waveguide core positioned in the vertical direction relative to the first waveguide core. The first waveguide core includes a tapered section and a plurality of segments separated by a plurality of gaps, and the second waveguide core includes a portion positioned adjacent to the first waveguide core.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
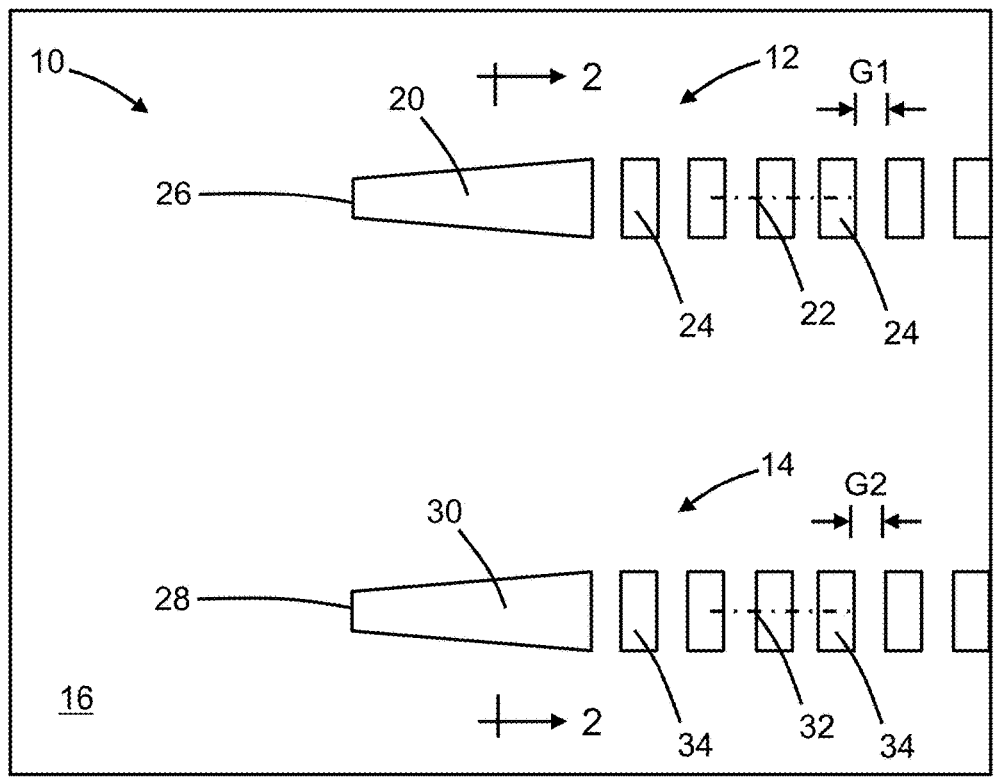
FIG. 1 is a top view of a structure at an initial fabrication stage of a processing method in accordance with embodiments of the invention.
Figure 2:
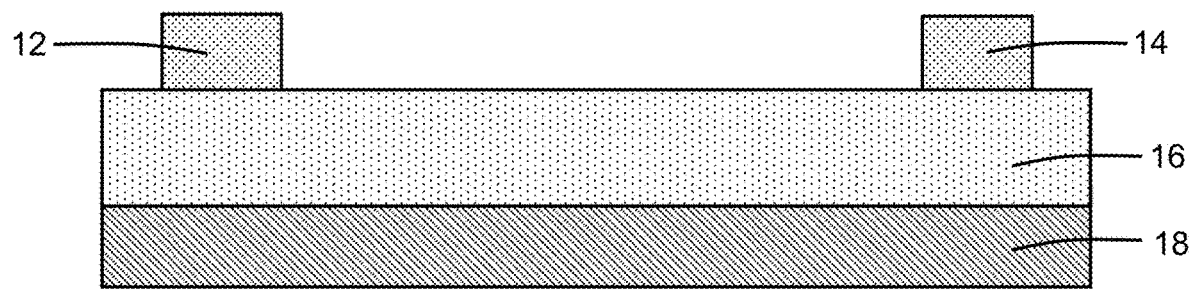
FIG. 2 is a cross-sectional view of the structure taken generally along line 2-2 in FIG. 1.

With reference to FIGS. 1, 2 and in accordance with embodiments of the invention, a structure 10 for an optical reflector includes a waveguide core 12 and a waveguide core 14 that are positioned on, and above, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate, and the dielectric layer 16 may separate the waveguide cores 12, 14 from the semiconductor substrate 18.

The waveguide core 12 includes a tapered section 20 and multiple segments 24 that are positioned with a spaced-apart arrangement along a longitudinal axis 22. Adjacent pairs of the segments 24 are separated in the spaced-apart arrangement by spaces or gaps G1. In an embodiment, the pitch and duty cycle of the segments 24 may be uniform to define a periodic arrangement. In alternative embodiments, the pitch and/or the duty cycle of the segments 24 may be apodized (i.e., non-uniform) to define a non-periodic arrangement. The tapered section 20 may terminate at an end surface 26, and the width of the tapered section 20 may increase with increasing distance from the end surface 26. In an embodiment, the segments 24 may have the same width dimension in a direction transverse to the longitudinal axis 22.

The waveguide core 14 includes a tapered section 30 and multiple segments 34 that are positioned with a spaced-apart arrangement along a longitudinal axis 32. Adjacent pairs of the segments 34 are separated in the spaced-apart arrangement by spaces or gaps G2. In an embodiment, the pitch and duty cycle of the segments 34 may be uniform to define a periodic arrangement. In alternative embodiments, the pitch and/or the duty cycle of the segments 34 may be apodized (i.e., non-uniform) to define a non-periodic arrangement. The tapered section 30 may terminate at an end surface 28, and the width of the tapered section 30 may increase with increasing distance from the end surface 28. In an embodiment, the segments 34 may have the same width dimension in a direction transverse to the longitudinal axis 32.

In an embodiment, the segments 24 and the segments 34 may be characterized by the same pitch and/or duty cycle. In an embodiment, the segments 24 may have a different pitch and/or duty cycle than the segments 34. In an embodiment, the segments 24 and the segments 34 may have a pitch in a range of 100 nm to 1000 nm, and a duty cycle in a range of 0.2 to 0.8.

In an embodiment, the waveguide cores 12, 14 may be comprised of a material having a refractive index that is greater than the refractive index of silicon dioxide. In an embodiment, the waveguide cores 12, 14 may be comprised of a semiconductor material. In an embodiment, the waveguide cores 12, 14 may be comprised of single-crystal silicon. In an embodiment, the waveguide cores 12, 14 may be comprised of polysilicon or amorphous silicon.

The waveguide cores 12, 14 may be formed by patterning a layer comprised of their constituent material with lithography and etching processes. In an embodiment, the waveguide cores 12, 14 may be formed by patterning the semiconductor material (e.g., single-crystal silicon) of a device layer of a silicon-on-insulator substrate. In an embodiment, the waveguide cores 12, 14 may be formed by patterning a deposited layer comprised of the constituent material (e.g., polysilicon or amorphous silicon). In an alternative embodiment, a slab layer may be connected to a lower portion of the waveguide core 12 and/or a lower portion of the waveguide core 14. The slab layer may be formed when the waveguide cores 12, 14 are patterned, and the slab layer, which is positioned on the dielectric layer 16, may have a thickness that is less than the thickness of the waveguide cores 12, 14.

Figure 3:
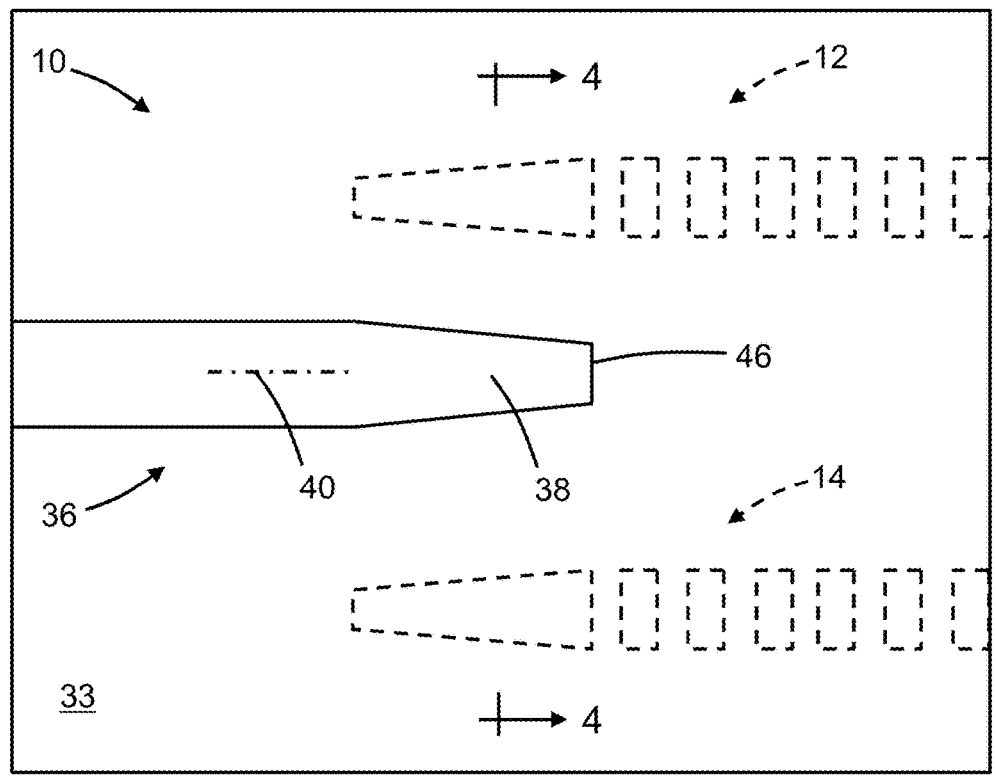
FIG. 3 is a top view of the structure at a fabrication stage subsequent to FIG. 1.
Figure 4:
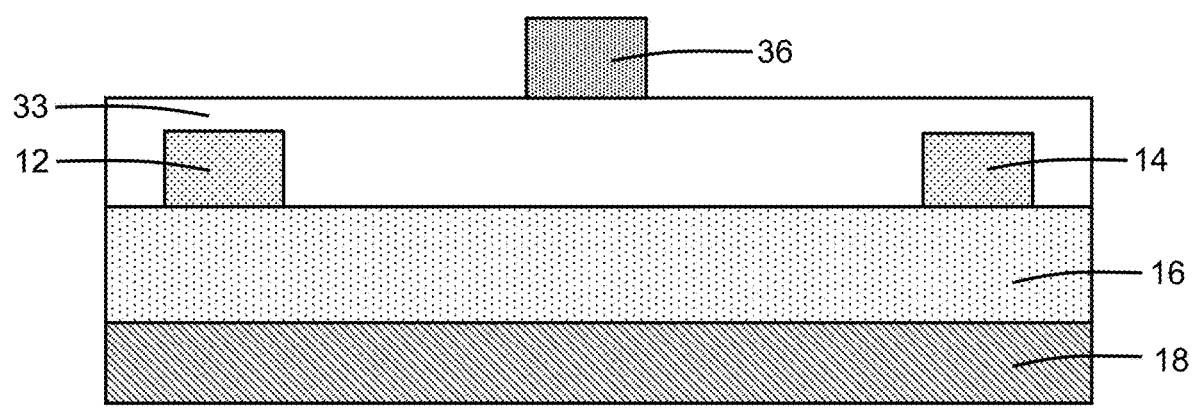
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 33 is formed over the waveguide cores 12, 14. The waveguide cores 12, 14 are embedded in the dielectric layer 33, which may be deposited and planarized after deposition, because the dielectric layer 33 is thicker than the height of the waveguide cores 12, 14. The dielectric layer 33 may be comprised of a dielectric material, such as silicon dioxide, having a refractive index that is less than the refractive index of the material constituting the waveguide cores 12, 14. Dielectric material of the dielectric layer 33 may be disposed in the gaps G1 between the segments 24 of the waveguide core 12 and the gaps G2 between the segments 34 of the waveguide core 14.

A waveguide core 36 may be formed on, and above, the dielectric layer 33. The waveguide core 36 may include a tapered section 38 that is positioned in a lateral direction between the tapered section 20 of the waveguide core 12 and the tapered section 30 of the waveguide core 14. The waveguide core 36 may extend along a longitudinal axis 40, which may be aligned parallel to the longitudinal axis 22 of the waveguide core 12 and the longitudinal axis 32 of the waveguide core 12. The tapered section 38 may terminate at an end surface 46, and the width of the tapered section 38 may increase with increasing distance from the end surface 46.

The tapered section 38 of the waveguide core 36, which is positioned adjacent to the tapered section 20 of the waveguide core 12 and the tapered section 30 of the waveguide core 14, may be longitudinally offset from the segments 24 of the waveguide core 12 and the segments 34 of the waveguide core 14. In that regard, the end surface 46 may terminate the tapered section 38 adjacent to the tapered sections 20, 30 such that the tapered section 38 does not extend longitudinally into the space laterally between the segments 24 and the segments 34. The longitudinal offset restricts lateral light transfer between the segments 24 and the tapered section 38, as well as restricts lateral light transfer between the segments 34 and the tapered section 38.

The tapered section 38 of the waveguide core 36 is laterally offset from the tapered section 20 and segments 24 of the waveguide core 12, and the tapered section 38 of the waveguide core 36 is laterally offset from the tapered section 30 and segments 34 of the waveguide core 14. In an embodiment, the tapered section 38 of the waveguide core 36 may be symmetrically positioned between the tapered section 20 of the waveguide core 12 and the tapered section 30 of the waveguide core 14. In an embodiment, the tapered section 38 of the waveguide core 36 may be asymmetrically positioned between the tapered section 20 of the waveguide core 12 and the tapered section 30 of the waveguide core 14. The waveguide cores 12, 14 are positioned in a vertical direction below the dielectric layer 33 such that the dielectric layer 33 separates the waveguide core 36 from the waveguide cores 12, 14. The tapered section 38 of the waveguide core 36 has a non-overlapping relationship with the tapered section 20 and segments 24 of the waveguide core 12 and with the tapered section 30 and segments 34 of the waveguide core 14.

The waveguide core 36 may be comprised of a dielectric material having a refractive index that is greater than the refractive index of silicon dioxide. In an embodiment, the waveguide core 36 may be comprised of silicon nitride. In an embodiment, the waveguide core 36 may be comprised of aluminum nitride or silicon oxynitride. In an embodiment, waveguide core 36 may be formed by depositing a layer of its constituent material over the dielectric layer 33 and patterning the deposited layer with lithography and etching processes.

Figure 5:
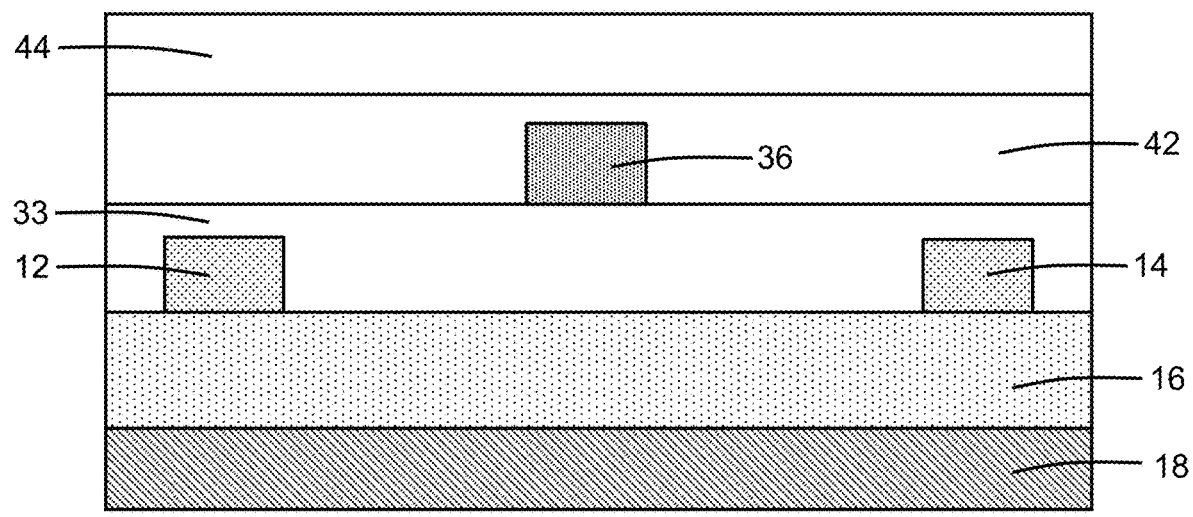
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 42 is formed on, and above, the waveguide core 36 and dielectric layer 33. The dielectric layer 42 may be comprised of a dielectric material, such as silicon dioxide, having a refractive index that is less than the refractive index of the material constituting the waveguide core 36. The waveguide core 36 is embedded in the dielectric layer 42, which may be deposited and planarized after deposition, because the dielectric layer 42 is thicker than the height of the waveguide core 36.

A back-end-of-line stack 44 may be formed over the dielectric layer 42. The back-end-of-line stack 44 may include dielectric layers that are comprised of a dielectric material, such as silicon dioxide, silicon nitride, tetraethylorthosilicate silicon dioxide, or fluorinated-tetraethylorthosilicate silicon dioxide.

In use, light may be guided on a photonics chip by the waveguide core 36 for input to the structure 10. The arriving light is transferred in a lateral direction from the tapered section 38 of the waveguide core 36 to the tapered section 20 of the waveguide core 12 and the tapered section 30 of the waveguide core 14. The transferred light propagating in the waveguide core 12 is reflected by the segments 24, and the transferred light propagating in the waveguide core 14 is reflected by the segments 34. The reflected light is transferred in a lateral direction from the tapered section 20 of the waveguide core 12 to the tapered section 38 of the waveguide core 36 and in a lateral direction from the tapered section 30 of the waveguide core 14 to the tapered section 38 of the waveguide core 36. The transferred reflected light propagates in the waveguide core 36 out of the structure 10.

The tapered sections 20, 30 promote bidirectional transfer of the light, and the reflected light departs the structure 10 in an opposite direction from its arrival.

The waveguide core 12 and the waveguide core 14 define Bragg reflectors that are embedded within the optical coupler, and the segments 24 of the waveguide core 12 and the segments 34 of the waveguide core 14 define respective Bragg gratings of the Bragg reflectors. The placement of the segments 24 of the waveguide core 12 and the segments 34 of the waveguide core 14 in a different level of the optical reflector from the waveguide core 36 permits the segments 24, 34 to be formed with a relaxed spacing. The relaxed spacing promotes improved filling of the inter-segment gaps G1, G2 by the dielectric material of the dielectric layer 42. The dielectric material in the gaps G1 between the segments 24 may be free of voids that would otherwise result from tighter spacing of the segments 24, and the dielectric material in the gaps G2 between the segments 34 may be free of voids that would otherwise result from tighter spacing of the segments 34. The optical reflector embodied in the structure 10 may result in improvements in performance of the optical reflector and may reduce variabilities in performance among different instances of the structure 10. The structure 10 may also be deployed in other types of optical components, such as Echelle gratings and Bragg filters, that incorporate optical reflectors.

Figure 6:
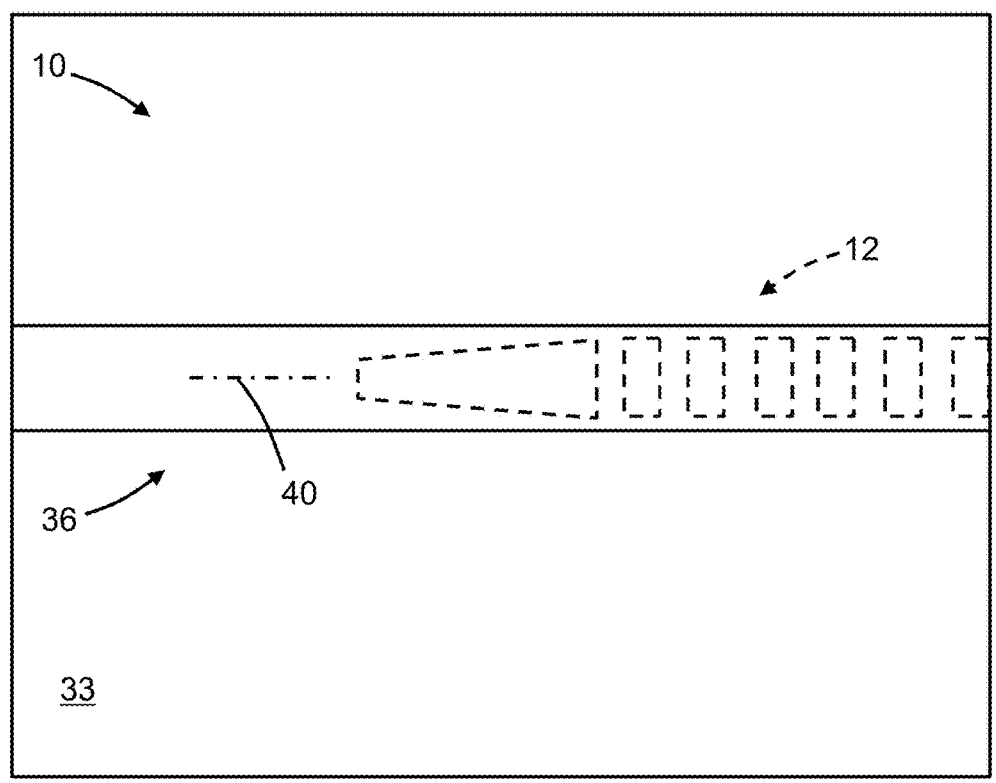
FIGS. 6-9 are top views of structures in accordance with alternative embodiments of the invention.

With reference to FIG. 6 and in accordance with alternative embodiments, the waveguide core 36 may have an overlapping relationship with the tapered section 20 and segments 24 of the waveguide core 12, the waveguide core 14 may be omitted from the structure 10, the waveguide core 36 may extend over and past the waveguide core 12 without terminating at an end surface of a tapered section. A portion of the waveguide core 36 is positioned adjacent to the tapered section 20 and segments 24 of the waveguide core 12. In an embodiment, a portion of the light propagating in the waveguide core 36 may be transferred to the tapered section 20 and reflected by the segments 24 back to the waveguide core 36 for propagation in a reverse direction, and another portion of the light may continue to propagate in the waveguide core 12 without transfer and reflection past the tapered section 20 and segments 24 of the waveguide core 12.

Figure 7:
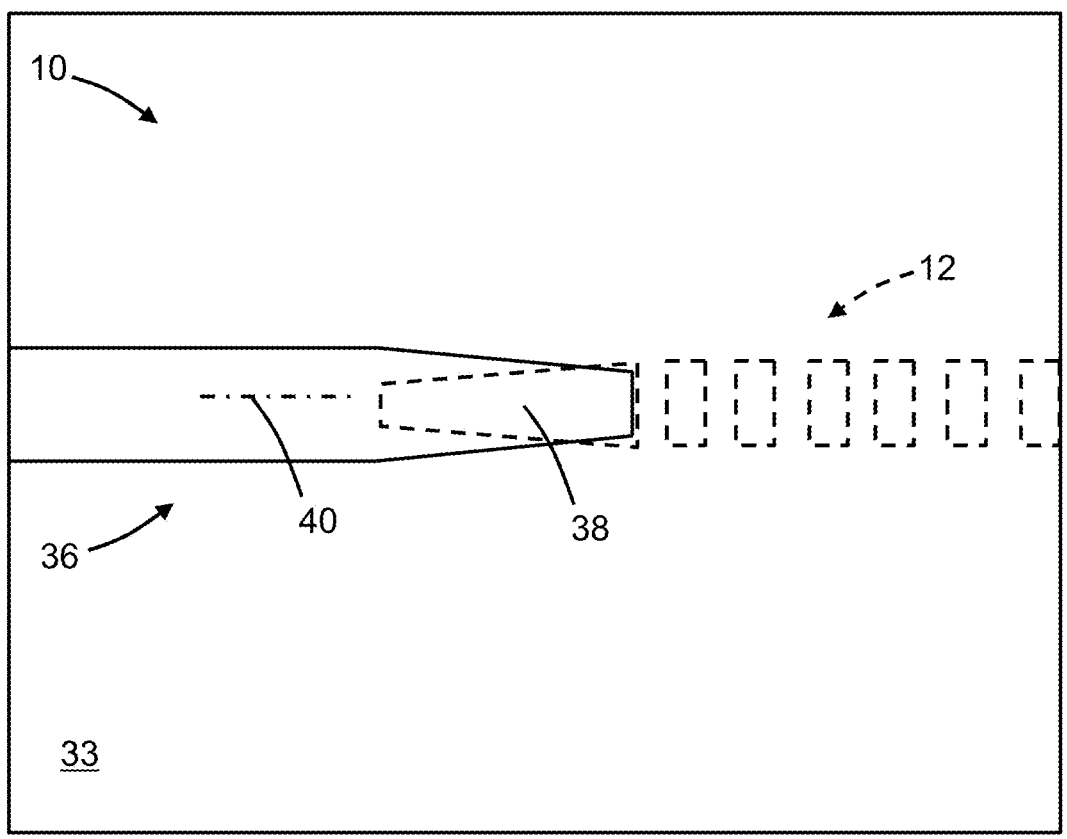

With reference to FIG. 7 and in accordance with alternative embodiments, the tapered section 38 of the waveguide core 36 may have an overlapping relationship with the tapered section 20 of the waveguide core 12, and the waveguide core 14 may be omitted from the structure 10. In use, light may be transferred in a vertical direction from the tapered section 38 of the waveguide core 36 to the tapered section 20 of the waveguide core 12, reflected by the segments 24, and transferred from the tapered section 20 back to the tapered section 38 of the waveguide core 36.

Figure 8:
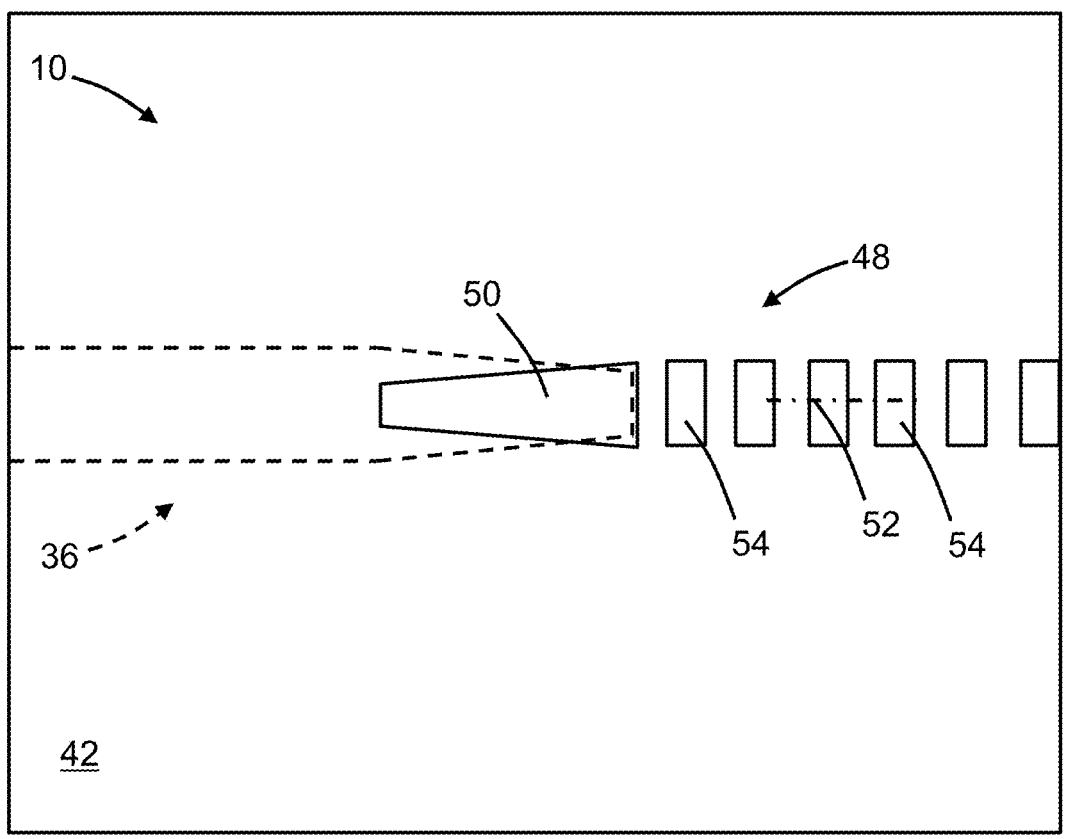

With reference to FIG. 8 in which like reference numerals refer to like features in FIG. 7 and in accordance with alternative embodiments, a waveguide core 48 that includes a tapered section 50 and spaced-apart segments 54 may be formed on the dielectric layer 42 over the waveguide core 36. The waveguide core 36 is positioned in a vertical direction between the waveguide core 12 and the waveguide core 48. The tapered section 50 and segments 54 may be arranged along a longitudinal axis 52, and the tapered section 50 may have an overlapping relationship with the tapered section 38 of the waveguide core 36 and with the underlying tapered section 20 of the waveguide core 12.

In an embodiment, the waveguide core 48 may be comprised of a material having a refractive index that is greater than the refractive index of silicon dioxide. In an embodiment, the waveguide core 48 may be comprised of a semiconductor material, such as polysilicon or amorphous silicon, that is deposited and patterned by lithography and etching processes. The tapered section 50 and segments 54 may has an overlapping relationship with the waveguide core 36. The addition of the waveguide core 48 may enhance the light reflection in excess of the light reflection provided by the waveguide core 12.

In an alternative embodiment, the waveguide core 12 may be omitted from the structure 10 such that only the waveguide core 48 provides the light reflection.

Figure 9:
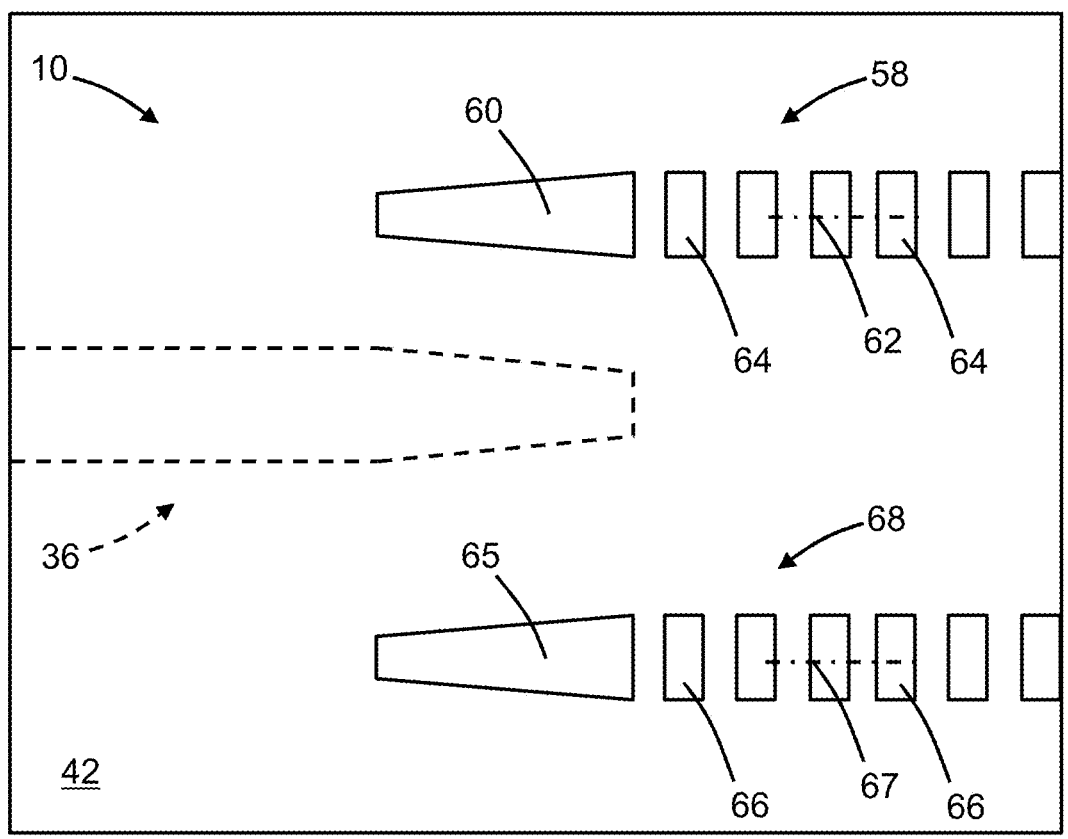

With reference to FIG. 9 in which like reference numerals refer to like features in FIG. 3 and in accordance with alternative embodiments, a waveguide core 58 may be formed that is laterally offset relative to the waveguide core 36, and a waveguide core 68 may be formed that is laterally offset relative to the waveguide core 36. The waveguide core 58 may have an overlapping relationship with the waveguide core 12, and the waveguide core 68 may have an overlapping relationship with the waveguide core 14. The waveguide cores 58, 68 each have a non-overlapping relationship with the tapered section 38 of the waveguide core 36.

The waveguide core 58 may include a tapered section 60 and spaced-apart segments 64 that are formed on the dielectric layer 42. The tapered section 60 and segments 64 may be arranged along a longitudinal axis 62. The waveguide core 68 may include a tapered section 65 and spaced-apart segments 66 that are formed on the dielectric layer 42. The tapered section 65 and segments 66 may be arranged along a longitudinal axis 67. In an embodiment, the waveguide cores 58, 68 may be comprised of a material having a refractive index that is greater than the refractive index of silicon dioxide. In an embodiment, the waveguide cores 58, 68 may be comprised of a semiconductor material, such as polysilicon or amorphous silicon, that is deposited and patterned by lithography and etching processes. The addition of multiple waveguide cores 58, 68 may enhance the light reflection in excess of the light reflection provided by the waveguide cores 12, 14.

In an alternative embodiment, the waveguide cores 12, 14 may be omitted from the structure 10 such that only the waveguide cores 58, 68 provide the light reflection for the optical reflector.

Figure 10:
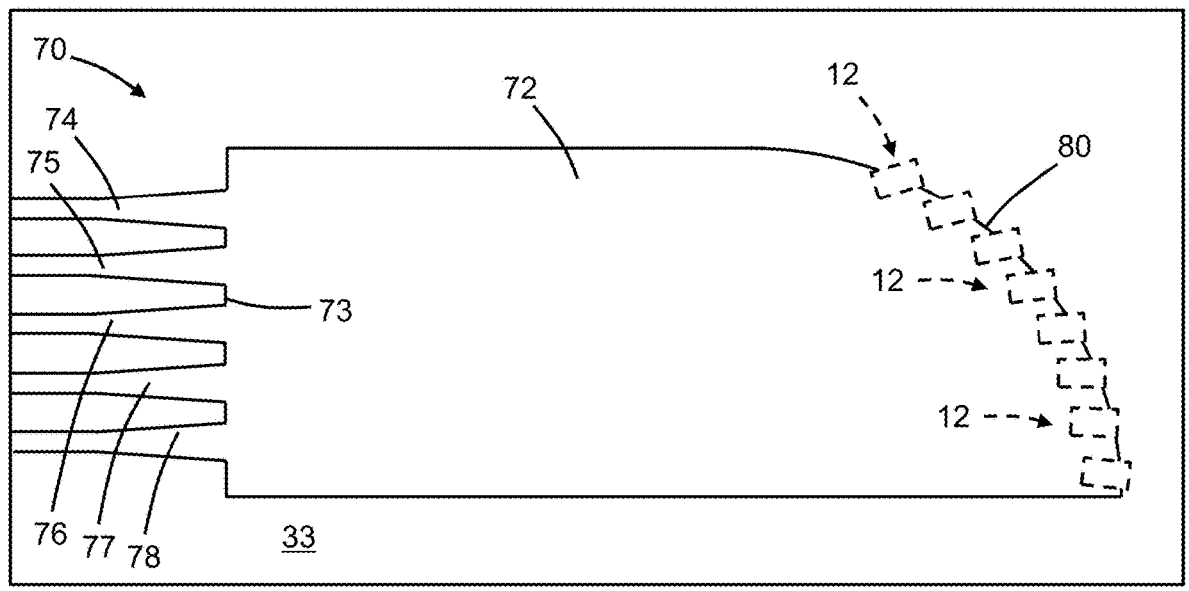
FIG. 10 is a top view of a structure in accordance with alternative embodiments of the invention.
Figure 11:
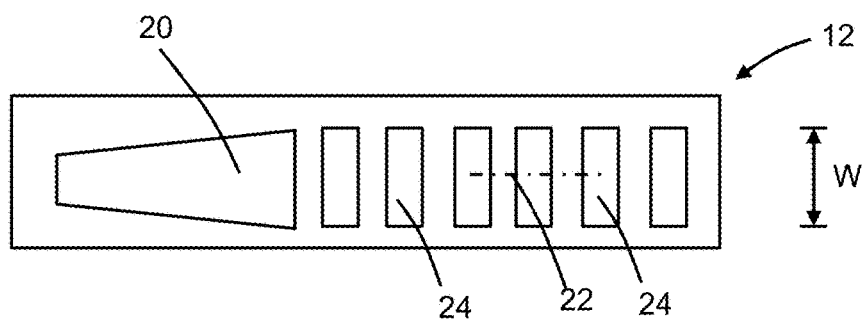
FIG. 11 is a top view of a portion of the structure of FIG. 10.
Figure 12:
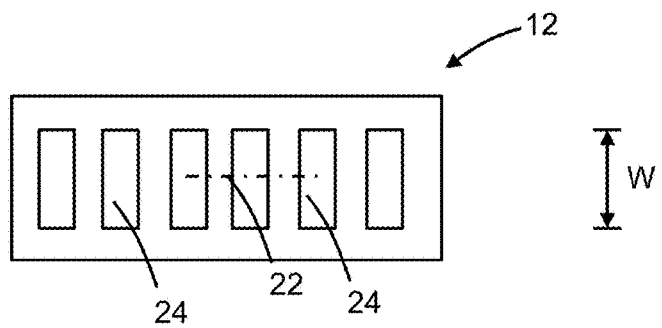
FIG. 12 is a top view of a portion of the structure of FIG. 10 in accordance with alternative embodiments of the invention.

With reference to FIGS. 10, 11, and 12 and in accordance with alternative embodiments, a structure 70 for an Echelle grating may include multiple instances of the waveguide core 12. The structure 70 includes a slab region 72, a waveguide core 74 connected to a side edge 73 of the slab region 72, and multiple waveguide cores 75, 76, 77, 78 that are connected to the same side edge 73 of the slab region 72 as the waveguide core 74. The multiple instances of the waveguide core 12 may be deployed in a spaced-apart arrangement at a curved side edge 80 of the slab region 72 that is opposite to the side edge 73. Each instance of the waveguide core 12 may have an overlapping relationship with the curved side edge 80.

The different instances of the waveguide core 12 may be tilted at different angles of inclination relative to each other, as diagrammatically shown in FIG. 10 by the different angular orientations of the dashed boxes representing the different instances of the waveguide core 12. More specifically, the longitudinal axes 22 of the different instances of the waveguide core 12 may be tilted at different angles of inclination relative to each other. In an embodiment, the different instances of the waveguide core 12 may have a width dimension W, and the width dimension that varies with increasing distance from the waveguide core 74 such that the tapered section 20 and segments 24 of the waveguide core 12 most distant from the waveguide core 74 are characterized by the largest width dimension W and the tapered section 20 and segments 24 of the waveguide core 12 closest to the waveguide core 74 are characterized by the smallest width dimension W.

The different instances of the waveguide core 12 define Bragg reflectors that are embedded within the Echelle grating, and the segments 24 define Bragg gratings of the Bragg reflectors. The different instances of the waveguide core 12 are located in a different level of the structure 70 from the slab region 72, the waveguide core 74, and the waveguide cores 75, 76, 77, 78. In an embodiment, the instances of the waveguide core 12 may be disposed in a vertical direction between the semiconductor substrate 18 (FIG. 5) and the slab region 72, waveguide core 74, and waveguide cores 75, 76, 77, 78. In an embodiment, the slab region 72, the waveguide core 74, and the waveguide cores 75, 76, 77, 78 may be comprised of a dielectric material, such as silicon nitride, and each instance of the waveguide core 12 may be comprised of a semiconductor material, such as silicon. In an embodiment and as shown in FIG. 11, each instance of the waveguide core 12 may include the tapered section 20 and segments 24. In an alternative embodiment and as shown in FIG. 12, each instance of the waveguide core 12 may include the segments 24 and lack the tapered section 20.

The Echelle grating may be deployed on a photonics chip to either multiplex or demultiplex light characterized by a broadband range, such as broadband light that spans an operating wavelength range of 1500 nm to 1600 nm. The instances of the waveguide core 12 may demultiplex broadband light arriving via the waveguide core 74 to provide demultiplexed light as outputs to the waveguide cores 75, 76, 77, 78. Alternatively, the instances of the waveguide core 12 may multiplex light arriving via the waveguide cores 75, 76, 77, 78 to provide broadband light for output to the waveguide core 74. The dimension of the slab region 72 between the side edge 73 and the side edge 80 promotes the multiplexing or demultiplexing by providing adequate separation space for the different optical paths of the light of different wavelengths reflected from the instances of the waveguide core 12.

The placement of the segments 24 of the waveguide cores 12 in a different level from the slab region 72, the waveguide core 74, and the waveguide cores 75, 76, 77, 78 permits the segments 24 to be formed with a spacing that promotes improved filling by the dielectric material of the subsequently-deposited dielectric layer 42 (FIG. 5).

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical reflector, the structure comprising:
   a semiconductor substrate;
   a first waveguide core positioned in a vertical direction over the semiconductor substrate, the first waveguide core including a first tapered section and a first plurality of segments separated by a first plurality of gaps; and
   a second waveguide core positioned in the vertical direction relative to the first waveguide core, the second waveguide core including a portion positioned adjacent to the first waveguide core.

2. The structure of claim 1 further comprising:
   a third waveguide core positioned in the vertical direction over the semiconductor substrate and adjacent to the portion of the second waveguide core, the third waveguide core including a second tapered section and a second plurality of segments separated by a second plurality of gaps.

3. The structure of claim 2 wherein the portion of the second waveguide core is positioned in a lateral direction between the first waveguide core and the third waveguide core.

4. The structure of claim 3 wherein the first waveguide core and the third waveguide core comprise polysilicon, amorphous silicon, or single-crystal silicon, and the second waveguide core comprises silicon nitride.

5. The structure of claim 2 wherein the portion of the second waveguide core is positioned in the vertical direction between the first waveguide core and the third waveguide core.

6. The structure of claim 5 wherein the first waveguide core comprises single-crystal silicon, the second waveguide core comprises silicon nitride, and the third waveguide core comprises polysilicon or amorphous silicon.

7. The structure of claim 1 wherein the first waveguide core comprises single-crystal silicon, and the second waveguide core comprises silicon nitride.

8. The structure of claim 1 wherein the first waveguide core comprises polysilicon or amorphous silicon, and the second waveguide core comprises silicon nitride.

9. The structure of claim 1 wherein the second waveguide core is positioned in an overlapping arrangement with the first tapered section and the first plurality of segments of the first waveguide core.

10. The structure of claim 1 wherein the second waveguide core includes an end surface and a tapered section that terminates at the end surface, and the first tapered section of the first waveguide core is positioned adjacent to the tapered section of the second waveguide core.

11. The structure of claim 10 wherein the tapered section of the second waveguide core is longitudinally offset from the first plurality of segments of the first waveguide core.

12. The structure of claim 1 further comprising:
a dielectric layer over the first waveguide core, the dielectric layer comprising a dielectric material, and the dielectric material of the dielectric layer disposed in the first plurality of gaps of the first waveguide core.

13. The structure of claim 1 wherein the first tapered section of the first waveguide core is configured to receive light transferred from the second waveguide core, and the first plurality of segments of the first waveguide core are configured to reflect the light back to the first tapered section of the first waveguide core for transfer to the second waveguide core.

14. A method of forming a structure for an optical reflector, the method comprising:
forming a first waveguide core positioned in a vertical direction over a semiconductor substrate, wherein the first waveguide core includes a tapered section and a plurality of segments separated by a plurality of gaps; and
forming a second waveguide core positioned in the vertical direction relative to the first waveguide core, wherein the second waveguide core includes a portion positioned adjacent to the first waveguide core.

* * * * *